US011188576B1

(12) United States Patent
Sathyanarayana et al.

(10) Patent No.: US 11,188,576 B1
(45) Date of Patent: Nov. 30, 2021

(54) SENSITIVE DATA EVALUATION (71) Applicant: International Business Machines Corporation, Armonk, NY (US)

(72) Inventors: Ragineni Sathyanarayana, Anantapur (IN); Sagar Deshpande, Bengaluru (IN); Mahesh Shivram Paradkar, Pune (IN); Raghuraman Seshadri, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/900,886

(22) Filed: Jun. 13, 2020

(51) Int. Cl.
*G06F 16/00* (2019.01)
*G06F 16/31* (2019.01)
*G06F 16/35* (2019.01)
*G06F 16/9032* (2019.01)
*G06F 16/903* (2019.01)

(52) U.S. Cl.
CPC .......... *G06F 16/328* (2019.01); *G06F 16/353* (2019.01); *G06F 16/90332* (2019.01); *G06F 16/90344* (2019.01); *G06F 2207/025* (2013.01); *H04L 2209/42* (2013.01)

(58) Field of Classification Search
CPC .............. G06F 16/328; G06F 16/353; G06F 16/90332; G06F 16/90344; G06F 2207/025; H04L 2209/42
See application file for complete search history.

(56) References Cited

U.S. PATENT DOCUMENTS

| 2015/0254555 | A1* | 9/2015 | Williams, Jr. | ....... G06N 3/0454 706/14 |
| 2015/0324606 | A1 | 11/2015 | Grondin | |
| 2016/0092090 | A1 | 3/2016 | Stojanovic | |
| 2017/0091680 | A1 | 3/2017 | Rosenthal | |
| 2018/0232528 | A1* | 8/2018 | Williamson | ........ G06F 21/6254 |
| 2020/0004980 | A1 | 1/2020 | Blass | |

(Continued)

OTHER PUBLICATIONS

"The NIST Definition of Cloud Computing," NIST Special Publication 800-145, National Institute of Standards and Technology, http://csrc.nist.gov/groups/SNS/cloud-computing/index.html, Sep. 28, 2011.

(Continued)

*Primary Examiner* — Diedra McQuitery
(74) *Attorney, Agent, or Firm* — Anthony V. S. England; Jeffrey S. LaBaw; Susan M. Maze (57) ABSTRACT

Evaluating risk of sensitive data associated with a target data set includes a computer system receiving a pattern that defines sensitive data and a selection of a data set as the target data set for evaluating. The system determines portions of the target data set from which to select sample data sets and determines, responsive to a confidence limit and sizes of the respective portions of the target data, a size of a sample data set for each respective target data set portion. The system randomly samples the target data set portions to provide sample data sets of the determined sample data set sizes and determines whether there is an occurrence of the sensitive data in each sample data set by searching for the pattern in the sample data sets. The system determines a proportion of the sample data sets that have the occurrence of the sensitive data.

20 Claims, 6 Drawing Sheets

(56) References Cited

U.S. PATENT DOCUMENTS

2020/0057864 A1* 2/2020 Parthasarathy ... G06F 16/24578
2020/0320224 A1* 10/2020 Regensburger ..... G06F 21/6254
2020/0380160 A1* 12/2020 Kraus ................... G06F 21/604

OTHER PUBLICATIONS

Mohammad Rafiqul Islam. Sample Size and Its Role in Central Limit Theorem (CLT). Computational and Applied Mathematics Journal. vol. 4, No. 1, 2018, pp. 1-7.

* cited by examiner

SENSITIVE DATA EVALUATION

BACKGROUND

Enterprises generally seek to protect personal data that is in their keeping and may, in some cases, be required by law to adopt certain protective measures. Accordingly, an enterprise may discover and evaluate risk associated with sensitive data stored across the enterprise's infrastructure. One tool for doing this is a "Data Risk Manager" software tool commercially available from International Business Machines Corporation.

SUMMARY

According to a computer implemented method for evaluating risk of sensitive data associated with a target data set, per an embodiment of the present invention, a computer system receives from a user a pattern that defines sensitive data and a selection of a data set as the target data set for evaluating. The computer system determines portions of the target data set from which to select sample data sets and a size of a sample data set for each respective target data set portion responsive to sizes of the respective portions of the target data set and to a predetermined confidence limit. The computer system performs random sampling of the target data set portions to provide sample data sets of the determined sample data set sizes, wherein the sample data sets, although smaller in size than the target data set portions, are of sizes that provide proportions of the sensitive data representative within the predetermined confidence limit of proportions of the sensitive data in the target data set portions. The computer system determines whether there is an occurrence of the sensitive data in each sample data set by the computer system searching for the received pattern in the selected sample data sets. The computer system determines a proportion of the sample data sets that have the occurrence of the sensitive data.

In other embodiments of the invention, other forms are provided, including a system and a computer program product.

BRIEF DESCRIPTION OF THE DRAWINGS

Features and advantages of the present invention will be more readily understood with reference to the attached figures and following description, wherein.

DETAILED DESCRIPTION

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

According to a computer implemented method, per an embodiment of the present invention, sample data sets are extracted by a computer from target data sets by random sampling. The sample data sets may be small in comparison to the target data sets and yet accurately represent distributions of the target data sets, since the sizes of the sample data sets are selected in accordance with the Central Limit Theorem. A regex pattern is applied on the extracted sample data sets, and the sample data sets are rated based on proportions of sensitive data therein, which indicates proportions of sensitive data in the target data sets by extrapolation. Since this method applies regex patterns on sample data sets instead of entire target data sets, it is faster and takes less memory for rating or other evaluation of the sample data.

Figure 1:
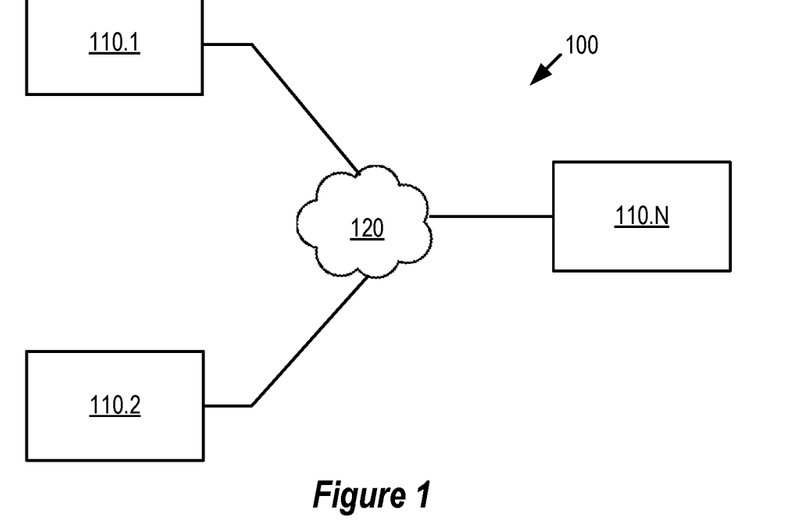
FIG. 1 illustrates a networked computer environment, according to embodiments of the present invention.

FIG. 1 illustrates an example computing environment 100, according to embodiments of the present invention. As shown, computing environment 100 includes computer systems 110.1, 110.2 through 110.N connects via network 120, which may be a public or private network. Systems 110.1, 110.2, etc. include modules, which may be program or hardware modules, configured to perform tasks for their own respective systems or for other systems or both, including tasks as described for elements of FIGS. 2 through 8 herein.

Figure 2:
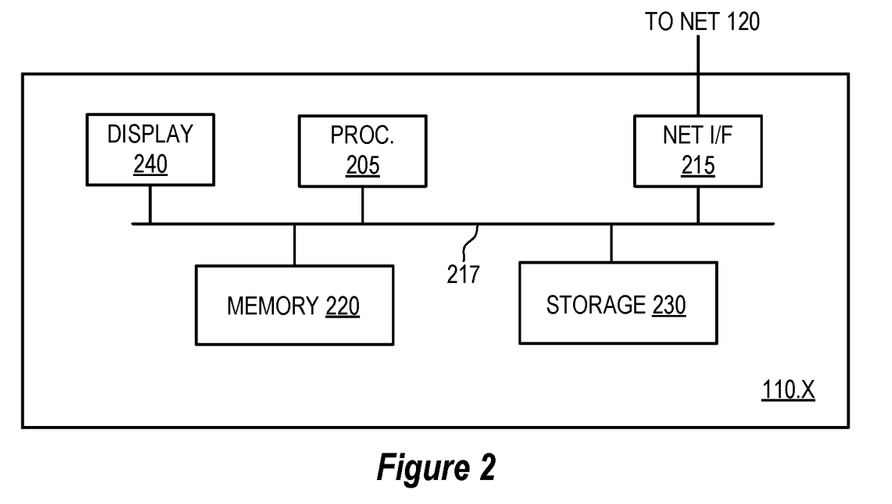
FIG. 2 is a block diagram of computer systems shown in FIG. 1, according to embodiments of the present invention.

FIG. 2 illustrates details of a computer system 110.X suitable as computer systems 110.1, 110.2, etc. according to embodiments of the present invention, wherein system 110.X includes at least one central processing unit (CPU) 205, network interface 215, interconnect (i.e., bus) 217, memory 220, storage device 230 and display 240. CPU 205 may retrieve and execute programming instructions stored in memory 220 for applications. Similarly, CPU 205 may retrieve and store application data residing in memory 220. Interconnect 217 may facilitate transmission, such as of programming instructions and application data, among CPU 205, storage 230, network interface 215, and memory 220. CPU 205 is representative of a single CPU, multiple CPUs, a single CPU having multiple processing cores, and the like. Additionally, memory 220 is representative of a random-access memory, which includes data and program modules for run-time execution. It should be understood that system 110.X may be implemented by other hardware and that one or more modules thereof may be firmware.

Figure 3:
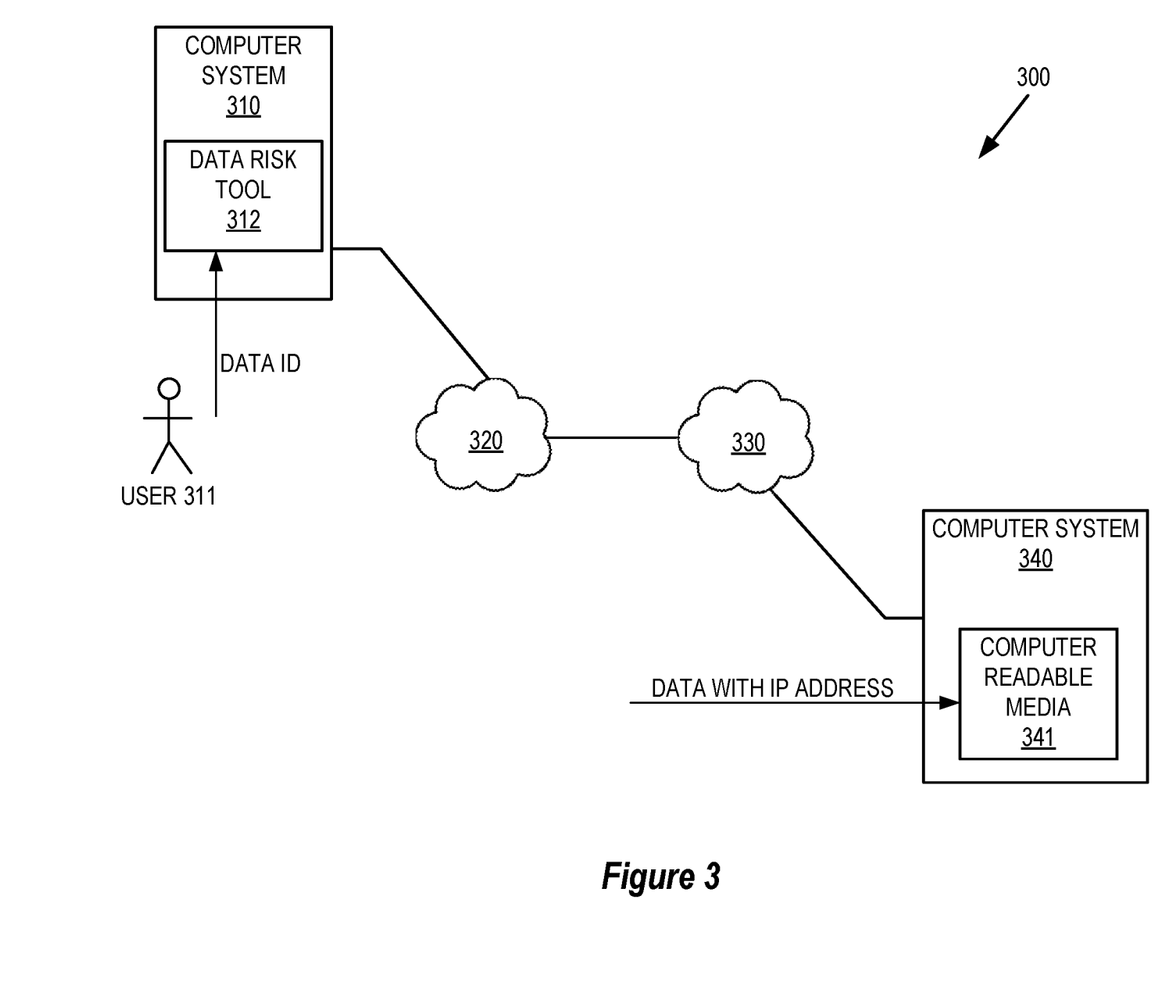
FIG. 3 illustrates a system of interconnected computer networks using standardized communication protocols, according to embodiments of the present invention.

FIG. 3 illustrates a system 300 of interconnected computer networks 320 and 330 using standardized communication protocols, such as the well-known Internet Protocol ("IP") wherein data may be stored on computer readable storage media 341 associated with a computer system 340 connected to one of the networks 330, wherein the data may be accessed on the network 330 by respective network addresses, such as IP addresses, for example. Data referred to herein as "enterprise data" includes data an enterprise owns (or otherwise has rights to) and may, in some instances, include data for which the enterprise is merely a caretaker. In general, enterprise data includes sets of stored data accessible on an "enterprise network," which includes a network owned and operated by the enterprise and may, in some instances, include a network owned or operated by others on behalf of the enterprise. (Likewise, a computer readable storage media on which enterprise data is stored may be referred to herein as "enterprise storage media.") According to an embodiment of the present invention, a data risk tool 312 is provided and runs on a computer system 310 to evaluate risk associated with particular data sets identified by a user 311.

Figure 4:
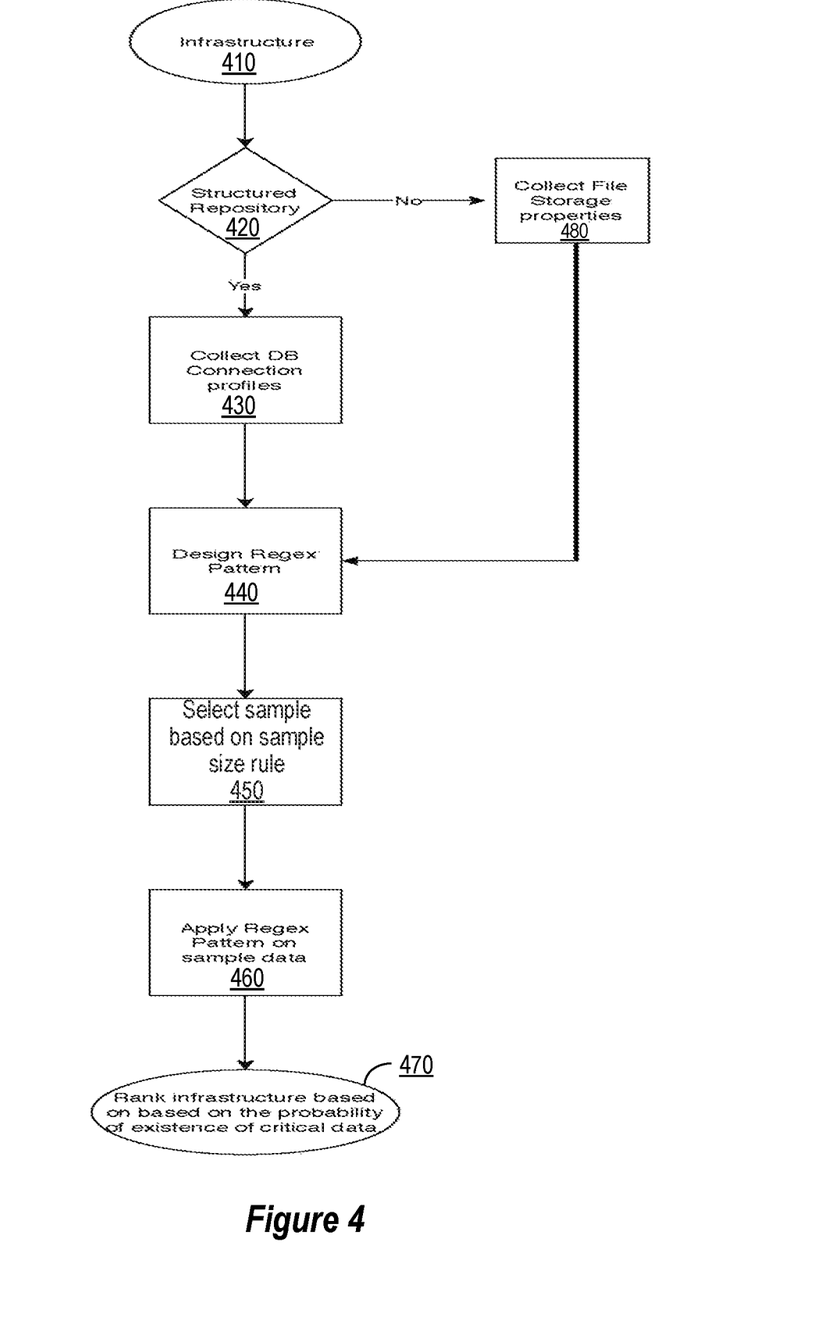
FIG. 4 depicts a flow chart for evaluating structured data, according to embodiments of the present invention.

Referring now to FIG. 4, process 400 executing for tool 312 (FIG. 3), according to an embodiment of the present invention, receives 410 enterprise data set identifications from a user, which indicate target data sets that the user wants the tool to evaluate. (Data to be evaluated may be structured, e.g., a database, or unstructured, e.g., a file. The term "infrastructure" may be used herein to refer to data that is evaluated, regardless of whether the data is structured or unstructured.) For an instance where the target data is structured, this is indicated 420/yes by the user, wherein the user identifies one or more target database tables, i.e., structured data, for process 400 to evaluate by database name and table name. Alternatively, the user may identify one or more databases without identifying table names, in which case process 400 will evaluate all the tables in the identified database(s). In a specific example of evaluating structured data, at 430 the user provides a target database connection profile to process 400, where the profile includes a database connection uniform resource locator ("URL") that process 400 communicates to database management system ("DBMS") software for connecting to a database table. The URL identifies the storage location of the target database, the name of the database to connect to and configuration properties, where the exact syntax of the database connection URL is specified by the particular DBMS. (As previously stated herein above, the URL may alternatively identify only the database name and no table name.)

A connection profile for a Microsoft SQL database named "XYZ" on a remote server is as follows in one example:
jdbc:sqlserver://localhostdatabaseName=XYZ;
integratedSecurity=true;

A connection profile for a DB2 database on an As/400 (iSeries) server, includes a Java Database Connectivity ("JDBC") connection string and JDBC driver string as follows in another example:
<bean                   id="as400DataSource" class="org.apache.commons.dbcp.BasicDataSource">
<property             name="driverClassName" value="com.ibm.as400.access.AS400JDBCDriver"/>
<property name="url" value="jdbc:as400://HOST/DATABASE;"/>
<property name="username" value="USERNAME"/>
<property name="password" value="PASSWORD"/>
</bean>

For an instance where the target data is unstructured, this is indicated 420/no to process 400 by the user, wherein the user identifies target files, i.e., unstructured data, for process 400 to evaluate by providing 480 a storage location of the files to process 400, for example. More specifically, for evaluating unstructured data, the user provides process 400 a file system path or network address (such as an IP address), for example. A file storage location profile is as follows in one example:
https://www.business_xyz.com/folder/56149879005

To evaluate sensitive enterprise data, data risk tool process 400 running on a computer system rates 470 identified enterprise data sets on an enterprise network according to proportions of sensitive data in the data sets. To identify sensitive data, process 400 receives 440 a particular regular expression that identifies numbers for a particular kind of credit card having a pattern of sixteen digits starting with "4893." The following are additional examples of regex patterns:

To find certain credit card information in a sample data set, for example, a regex pattern such as "^4[0-9]{12}(?:[0-9]{3})?$" is provided to process 400

10 to 15 digit Bank Account number regex pattern: "^[1-9][0-9]{14}"

Indian Pincode regex pattern: "^[1-9][0-9]{5}$"

In one way of evaluating a target data set, a process unlike process 400 exhaustively searches all the records in each table of the identified target data set (i.e., database) to find records in the target data set that match the regex pattern that process 400 receives. According to this one way of evaluating, unlike the way shown in FIG. 4, the process searches all records in each target data set, counts each one of those records that match the regex pattern and then uses this count to rate the target data set. It is a drawback that this exhaustive searching and matching takes a lot of time and memory, regardless of whether the records are structured or unstructured.

In a different way of evaluating risk sensitivity of target data sets, according to one or more embodiments of the present invention shown in FIG. 4, process 400 searches 450 less than all the target data, which it does after it receives 430 identification of the target data set (a database, for example, identified by a connection profile) and after it receives 440 a particular regular expression (identifying numbers for a particular kind of credit card having a pattern of sixteen digits starting with "4893," for example). In this different way of evaluating shown in FIG. 4, instead of finding all the records that match the regex pattern in each entire target data set, process 400 first randomly selects 450 sample data sets of the records in each target data set, then finds 460 records in the sample data sets that match the regex pattern received by process 400 from the user and responsively generates 470 a sensitive information rating for the target data set. That is, the rating is an estimate of the proportion of sensitive information in each target data set. This rating is done by searching 460 only sample data sets from the target data set, where each sample data set has n randomly selected items (i.e., records in the case of a target database or files in the case of unstructured data), which improves processing efficiency by reducing processing and memory consumption in comparison to exhaustive searching.

Process 400 determines how many items to select for each sample data set such that the items in each sample are sufficiently representative of the items from which the respective sample was selected, where the number of items process 400 selects for each sample is based on one or more predetermined sample size rules. Details are provided herein below regarding various sample size rules, according to embodiments of the present invention. But first, examples are provided below to illustrate how process 400 may determine the number of rows or files in a target data set. Those examples are followed by pseudocode for process 400.

To determine how many records to include in sample data sets for each target data set, process 400 first determines how many records are in the target data set (e.g., table in this instance), which it may do in the following manner for a database table named "Sample," for example:
//Registering the driver DriverManager.registerDriver
(new com.mysql.jdbc.Driver( ));

```
//Getting the connection
String mysqlUrl="jdbc:mysql:mysql://localhost/mydata-
    base";mysql://localhost/mydatabase";
Connection    con=DriverManager.getConnection
    (mysqlUrl, "root", "password"):
Statement stmt=con.createStatement( );
//Retrieving the data ResultSet rs=stmt.executeQuery
    ("select count(*) from Sample");
rs.next( );
//Moving the cursor to the last row returns the count of
    records in the table rs.getInt("count(*)")
```

In an instance where the target data set is files in a directory instead of records in a database table, process 400 first determines how many files are in the directory, which it may do in the following manner for a directory named "Source folder," for example:

```
File directory=new File("Source folder");
int fileCount=directory.list( ).length;
```

The following pseudocode for process 400 evaluates a database, according to an embodiment of the present invention:

```
Connect to database using Connection profiles
Fetch all tableNames along with rowcounts of each table
If there are less than 10 tables in the database, perform
    stratified sampling:
  Loop through each table
    Define chunks to cover entirety of current table, where
      chunk size is based on rowCount for the current
      table, e.g., chunk is 10% of rowCount
    Loop through each chunk for all chunks (e.g., ten chunks
      to cover the entire table when chunk size is 10% of
      rowCount)
      Select a random sample of n records from each chunk,
        where n is calculated based on the number of records
        in each chunk Loop through each record in the
        sample for the current chunk
        Apply regex pattern on each record. If there is a
          match, mark the current chunk as "Sensitive,"
          come out of the loop and process next chunk
  Rate the database based on how many chunks are marked
    "Sensitive"
If there are more than 10 tables in the database, perform
    non-stratified sampling:
  Loop through each table
    Select a random sample of n records from current table
      (instead of samples from chunks of the table), where n
      is calculated based on the number of records in the table
    Loop through each record for the current table
      Apply regex pattern on each record. If there is a match,
        mark the current table as "Sensitive" and come out of
        the loop and process next table
  Rate the database based on how many tables are marked
    "Sensitive"
```

In an embodiment of the present invention illustrated by the above pseudocode, it is noteworthy that process 400 performed by the tool for a target database having 10 tables or less performs stratified sampling of the tables, wherein process 400 selects more than one sample data set per table (1 sample data set from each of 10 chunks per table, for a total of 10 sample data sets per table in the instance illustrated), whereas for a database having more than 10 tables, the process performs non-stratified sampling, wherein process 400 selects only a single sample data set per table. This avoids having an unreasonably large number of samples for databases having larger numbers of tables. (In general, a user may specify to process 400 a different predetermined threshold number of tables, i.e., other than 10, as the maximum number for which stratified sampling is performed. Likewise, the user may specify to process 400 a different predetermined number of chunks into which process 400 will divide the table.)

It is also noteworthy that in the above pseudocode-illustrated embodiment, process 400 stops its regex pattern searching in each sample data set upon finding a first match in the respective sample data set. Thus, if sample size is 400, for example, and process 400 finds a first match at the 20th record in a current sample data set, then process 400 marks the current sample data set as "Sensitive" based only on the match at the $20^{th}$ record, stops searching the current sample data set and proceeds with searching for the regex pattern in the next sample data set of records and so on. As previously stated herein, selecting sample data sets from a target data set and then searching the samples instead of exhaustively searching the entire target data set, improves processing efficiency by reducing processing and memory consumption in comparison to exhaustive searching. Likewise, stopping the searching of each sample data set when a first match is found in that respective sample data set also improves processing efficiency.

The above pseudocode example indicates that process 400 rates the target data set (e.g., database) based on how many sample data sets that process 400 marked "Sensitive" in the course of the search process, according to an embodiment of the present invention. More specifically, in one way of evaluating, if less than 30% of total samples of the database are marked as Sensitive, process 400 rates that infrastructure as "LOW;" if 30% to 70% of total samples of the database are marked as Sensitive, process 400 rates that infrastructure as "MEDIUM;" and if more than 70% of total samples of the database are marked as Sensitive, process 400 rates that infrastructure as "HIGH." In other instances, a user of process 400 may specify other thresholds, i.e., other than 30% and 70%.

The following is another example of sampling, according to an embodiment of the present invention. In this instance, the target data set is unstructured, i.e., files rather than database records, and there are 10 million files in the target data set, which are in an enterprise's repository and range in file size from Bytes to Petabytes. In one way of operating, process 400 is configured to perform stratified sampling 450 according to ten, predetermined categories ("chunks") of files in respective file size ranges, wherein a sample data set is randomly selected from each respective one of the chunks of files. According to one embodiment of the present invention, process 400 is configured to identify the chunks of files as in the following table.

TABLE ONE

| Sample data set | Size of files |
| --- | --- |
| 1 | 500 bytes or less |
| 2 | more than 500 bytes and no more than 1 KB |
| 3 | more than 1 KB and no more than 500 KB |
| 4 | more than 500 KB and no more than 1 MB |
| 5 | more than 1 MB and no more than 500 MB |
| 6 | more than 500 MB and no more than 1 GB |
| 7 | more than 1 GB and no more than 500 GB |
| 8 | more than 500 GB and no more than 1 TB |
| 9 | more than 1 TB and no more than 500 TB |
| 10 | more than 500 TB |

Further, in this example instance for stratified sampling, the number of files, n, in each respective sample data set is based on the number of files present in each of the respective chunks and on a sample size rule such as described herein below.

In one sample size rule of an embodiment of the present invention, process 400 determines the sample data set size, n (such as a number of rows for structured data or files for unstructured data), for random selection without replacement, where $n = n_0/(1+(n_0/N))$ and if $n_0/(1+(n_0/N)) < 30$, then $n=30$ N is the size of a portion of the target data from which the sample data set will be selected, $n_0 = ((Z \text{ score} * 0.5)/\text{desired level of precision})^2$ and Z score is 1.645 for 90% confidence level, 1.96 for 95% confidence level and 2.57 for 99% confidence level.

In another sample size rule for an embodiment of the present invention, process 400 uses a simplified formula to determine the sample data set size (selected randomly without replacement). According to the simplified formula, n is at least 30, as in the previous rule. Otherwise, $n=N/(1+N*(\text{desired precision})^2)$, where N is, again, the size of a portion of the target data from which the sample data set will be selected and if $N/(1+N*(\text{desired precision})^2) < 30$, then $n=30$.

In another sample size rule for an embodiment of the present invention, rule designates that process 400 determine a sample data set size, n, to be n=10% of N, the portion of the target data from which the sample data set will be selected, unless 10% of N is less than 30, in which case n=30.

Figure 7:
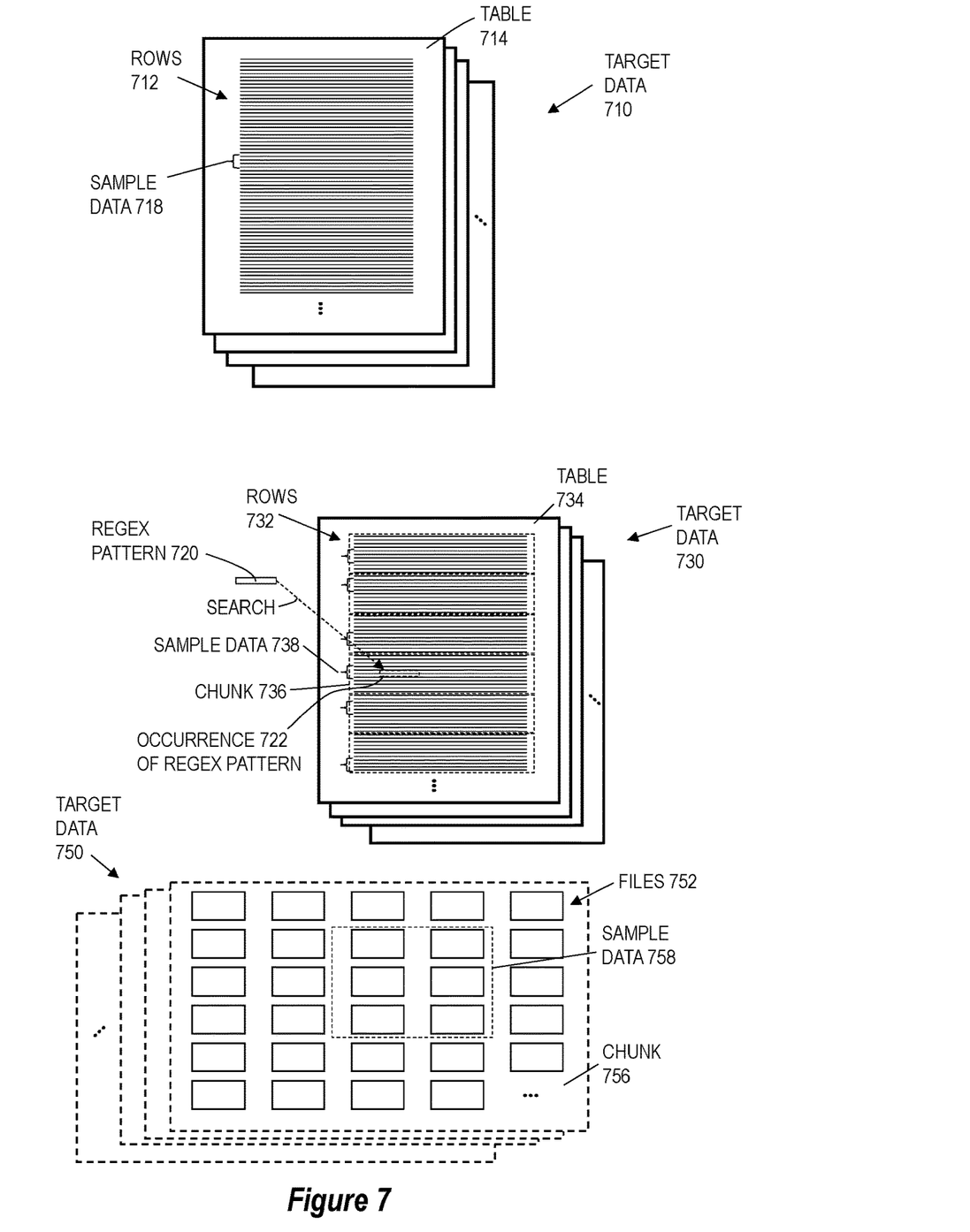
FIG. 7 illustrates target data sets and sample data sets and processing thereof for various scenarios, according to embodiments of the present invention.

Referring now to FIG. 7, target data and sample data are illustrated for three scenarios, according to embodiments of the present invention. In one of the scenarios shown, a target data set 710 is structured data (i.e., a set of database tables in the illustrated instance, a representative one of which is labeled in FIG. 7 as table 714). In this illustrated scenario, a predefined threshold number is exceeded by the number of tables 714 in target data set 710. Consequently, process 400 (FIG. 4) responsively determines that it will select sample data sets from tables 714 without dividing tables 714 into chunks. (A representative one of the sample data sets is labeled in FIG. 7 as sample data set 718.) In other words, the determined portions of target data set 710 from which process 400 will select respective sample data sets 718 are tables 714. Correspondingly, process 400 selects each sample data set 718 from among all rows 712 of a respective one of tables 714 (instead of selecting a sample data set from each chunk of a table, for example, as in the next scenario).

In a second one of the scenarios shown, a target data set 730 is structured data again, but in this illustrated scenario, a predefined threshold number is not exceeded by the number of tables 734 in target data set 730. Consequently, process 400 (FIG. 4) responsively determines that it will divide tables 734 into chunks 736 of rows 732, such that the rows 732 of all the chunks 736 for each table 734 cover all the rows 732 of the respective table. Process 400 selects a sample data set from among the rows 732 of each chunk 736 of each table 734. In other words, the chunks 736 of tables 734 are the portions of target data set 730 from which process 400 will select respective sample data sets 738. Correspondingly, process 400 selects a sample data set 738 from among the rows 712 of each chunk 736, so that process 400 selects as many sample data sets 738 as there are chunks 736 in all the tables 734 combined.

In a third one of the scenarios shown, a target data set 750 is unstructured data (i.e., files 752 in the illustrated instance). Consequently, process 400 (FIG. 4) responsively determines that it will divide files 752 into chunks 756 of files. (As in one embodiment that was described herein above, for example, each chunk 756 is limited to files 752 within a respective predetermined range of file sizes. Thus, a first one of chunks 756 has the smallest ones of files 752 and a last one of chunks 756 has the largest ones of files 752, for example.) Process 400 further determines that it will select a sample data set 758 from each chunk 756 of files 752. In other words, the determined portions of target data set 750 from which process 400 will select respective sample data sets 758 are chunks 756 of files 752. Correspondingly, process 400 selects a sample data set 758 from each chunk 756, so that process 400 selects as many sample data sets 758 as there are predetermined file size ranges (which define respective chunks 756).

The second one of the scenarios shown in FIG. 7 explicitly illustrates additional details, although the same details apply equally to the other illustrated scenarios. That is, FIG. 7 shows that process 400 (FIG. 4) has received (from a user) identification of target data set 730 as a data set for evaluating and has received a regex pattern 720 that defines sensitive data. Process 400 determines portions of target data set 730 from which to select sample data sets, as described herein above. Process 400 further determines, responsive to a predetermined confidence limit and responsive to the number of row 732 of the respective chunks 736 of target data set 730, a size (number of rows 732) of a sample data set 738 for each respective target data set portion (chunk 736), as has been described herein above. Process 400 randomly selects, by performing random sampling of the respective target data set chunks 736, respective sample data sets 738 of the determined numbers of rows. The sample data sets 738, although having less rows than the target data set 730 chunks 736, have enough rows to provide proportions of the sensitive data representative within the predetermined confidence limit of proportions of the sensitive data in the target data set 730 chunks 736.

As the second one of the scenarios shown in FIG. 7 further illustrates, process 400 determines whether there is an occurrence 722 of the sensitive data defined by regex pattern 720 in each sample data set 738 by searching for the received pattern 720 in the selected sample data sets 738. In an embodiment, each time process 400 finds a first occurrence 722 of the sensitive data defined by regex pattern 720 in a sample data set 738, process 400 stops searching in that sample data set 738 and begins searching the next sample data set 738. Once process 400 has searched each sample data set 738, i.e., each set 738 from each respective chunk 736 of each table 734, process 400 determines a proportion of the sample data sets 738 that have an occurrence 722 of the sensitive data defined by regex pattern 720 and provides for the user a rating of the target data set 730 based on the proportion of the sample data sets 738 that have the occurrence 722 of the sensitive data defined by regex pattern 720.

In an embodiment of the present invention according to the above described second scenario, the rows 732 of each chunk 736 are contiguous rows as shown in FIG. 7. This embodiment of the invention involves a recognition that for databases having fewer tables 734 (as in this second scenario), sensitive data 722 may sometimes tend to be more clustered together within one or more of the tables 734. Since in instances when there are fewer tables as in the second scenario, process 400 defines chunks 736 of contiguous rows 732 for each table 734 such that the chunks 736 for each table 734 cover all the rows 732 of the respective table 734, and since process 400 samples in these instances to provide a sample data set 738 from each chunk 736 and searches for sensitive data 722 within each sample data set 738, it is more certain that process 400 will detect sensitive data 722 clustered in one or more of the tables 734 than it would if process 400 merely sampled tables to provide one sample data set sampled from the whole of each table (as in the first scenario herein above) before searching within the sample data sets.

Similarly, an embodiment of the invention as disclosed in the third scenario herein above involves a recognition that sensitive data may sometimes tend to be clustered together in files 752 of a limited range of file sizes (or at least within a limited set of file size ranges). Since process 400 organizes files into chunks 756 by file size, samples to provide a sample data set 758 from each chunk and searches for sensitive data within each sample data set, it is more certain that process 400 will detect sensitive data clustered in files 752 of one or more file size ranges than it would if process 400 merely sampled all the files to provide one or more sample data set without regard to file sizes before searching within sample data set(s).

It is to be understood that although this disclosure includes the following detailed description of cloud computing, implementation of the teachings recited herein are not limited to a cloud computing environment. Rather, embodiments of the present invention are capable of being implemented in conjunction with any other type of computing environment now known or later developed.

A cloud computing model of service delivery may include at least five characteristics, at least three service models, and at least four deployment models. Characteristics for a cloud computing model are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service models for cloud computing are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment models for cloud computing are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling computing resources.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
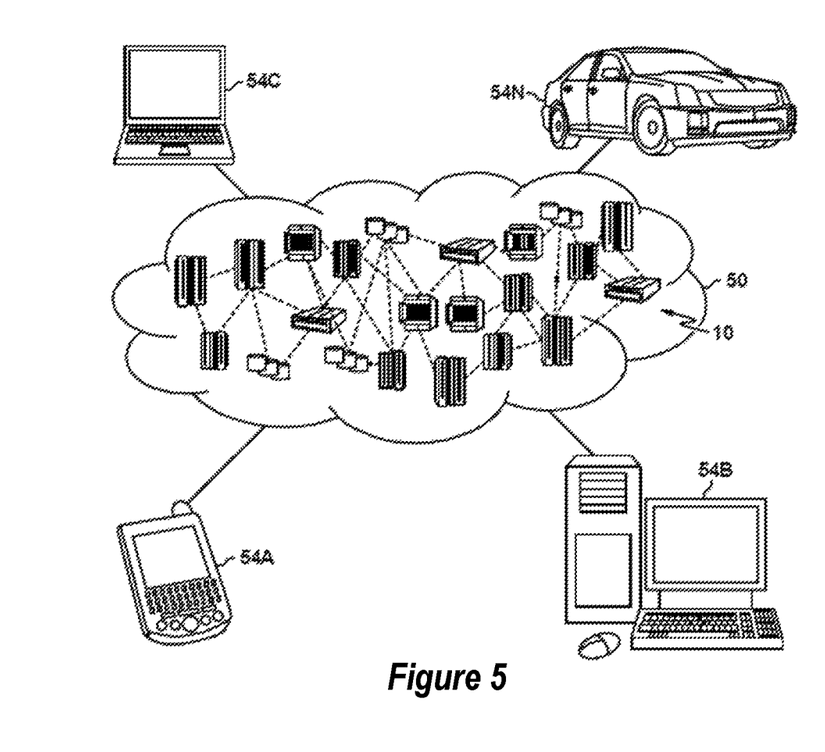
FIG. 5 depicts a cloud computing environment, according to embodiments of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
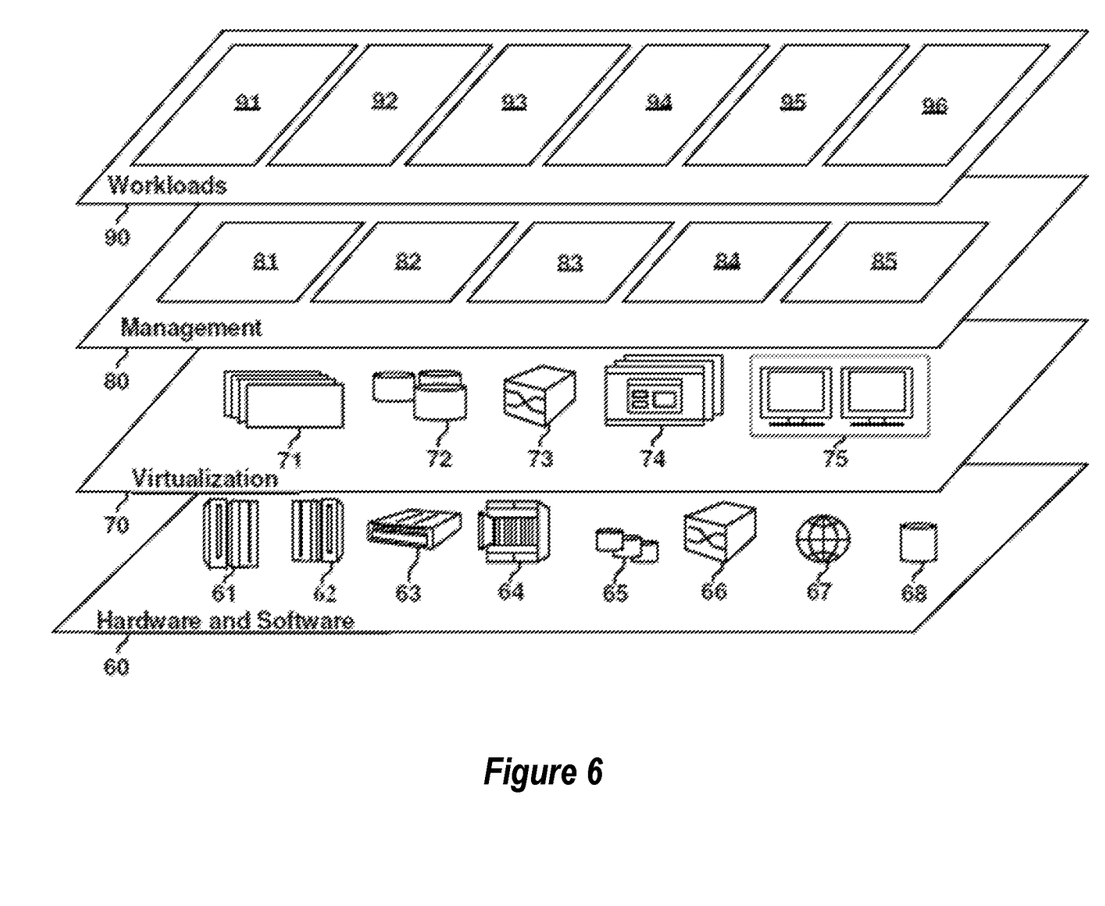
FIG. 6 depicts abstraction model layers, according to embodiments of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91, software development and lifecycle management 92, virtual classroom education delivery 93, data analytics processing 94, transaction processing 95, and providing sensitive data evaluation resources to a user 96.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

One or more databases may be included in a host for storing and providing access to data for the various implementations. One skilled in the art will also appreciate that, for security reasons, any databases, systems, or components of the present invention may include any combination of databases or components at a single location or at multiple locations, wherein each database or system includes any of various suitable security features, such as firewalls, access codes, encryption, de-encryption and the like.

The database may be any type of database, such as relational, hierarchical, object-oriented, and/or the like. A database product that may be used to implement the databases is IBM® DB2®, or other available database products. (IBM and DB2 are trademarks of International Business Machines Corporation, registered in many jurisdictions worldwide.) The database may be organized in any suitable manner, including as data tables or lookup tables.

Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a key field in each of the manufacturer and retailer data tables. A key field partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

While this specification contains many specifics, these should not be construed as limitations on the scope of the invention or of what can be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable sub combination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Likewise, the actions recited in the claims can be performed in a different order and still achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products. Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, no element described herein is required for the practice of the invention unless expressly described as essential or critical.

The corresponding structures, materials, acts, and equivalents of all means or step plus function elements in the claims below are intended to include any structure, material, or act for performing the function in combination with other claimed elements as specifically claimed. It should be appreciated that the particular implementations shown and described herein are illustrative of the invention and its best mode and are not intended to otherwise limit the scope of the present invention in any way. Other variations are within the scope of the following claims. Many modifications and variations will be apparent to those of ordinary skill in the art without departing from the scope and spirit of the invention. The embodiments presented herein were chosen and described in order to best explain the principles of the invention and the practical application and to enable others of ordinary skill in the art to understand the invention for various embodiments with various modifications as are suited to the particular use contemplated. The description of the present invention has been presented for purposes of illustration and description but is not intended to be exhaustive or limited to the invention in the form disclosed.

What is claimed is:

1. A computer implemented method for evaluating risk of sensitive data associated with a target data set, the method comprising:
   receiving from a user, by a computer system, a pattern that defines sensitive data and a selection of a data set as the target data set for evaluating;
   determining, by the computer system, portions of the target data set from which to select sample data sets and a size of a sample data set for each respective target data set portion responsive to sizes of the respective portions of the target data set and to a predetermined confidence limit;
   performing, by the computer system, random sampling of the target data set portions to provide sample data sets of the determined sample data set sizes, wherein the sample data sets, although smaller in size than the target data set portions, are of sizes that provide the sensitive data in proportions that are, within the predetermined confidence limit, representative of the sensitive data in the target data set portions;
   determining whether there is an occurrence of the sensitive data in each sample data set by the computer system searching for the received pattern in the selected sample data sets; and
   determining, by the computer system, a proportion of the sample data sets that have the occurrence of the sensitive data.

2. The method of claim 1 further comprising:
   providing for the user, by the computer system, a rating of the target data set based on the proportion of the sample data sets that have the occurrence of the sensitive data.

3. The method of claim 1, wherein in the searching for the received pattern in the selected sample data sets, the computer system stops the searching in each selected sample data set responsive to finding a first occurrence of the received pattern in the respective sample data set.

4. The method of claim 1, wherein the determining the portions of the target data set from which to select sample data sets is responsive to the target data set having database tables, wherein the tables are more numerous than a predefined threshold and each determined portion of the target data set is a table, such that each sample data set is selected from a respective one of the tables.

5. The method of claim 1, wherein the determining the portions of the target data set from which to select sample data sets is responsive to the target data set having database tables, wherein the tables are not more numerous than a predefined threshold and each determined portion of the target data set is a portion of a respective one of the tables such that each sample data set is selected from a respective one of the portions of a respective one of the tables.

6. The method of claim 1, wherein the determining the portions of the target data set from which to select sample data sets is responsive to the target data set being unstructured data, such that each portion of the target data set is a set of files, wherein the selecting the portions of the target data set from which to select sample data sets limits each respective set of files to files within a respective, predefined range of file sizes.

7. The method of claim 1, wherein the determining the size of the sample data set for each respective target data set portion includes determining the size of the respective sample data set further in response to a predetermined level of precision.

8. A computer system for evaluating risk of sensitive data associated with a target data set, the system comprising:
   a processor; and
   a computer readable storage medium connected to the processor, wherein the computer readable storage medium has stored thereon a program for controlling the processor, and wherein the processor is operative with the program to execute the program for:
      receiving from a user, by the computer system, a pattern that defines sensitive data and a selection of a data set as the target data set for evaluating;
      determining, by the computer system, portions of the target data set from which to select sample data sets and a size of a sample data set for each respective target data set portion responsive to sizes of the respective portions of the target data set and to a predetermined confidence limit;
      performing, by the computer system, random sampling of the target data set portions to provide sample data sets of the determined sample data set sizes, wherein the sample data sets, although smaller in size than the target data set portions, are of sizes that provide the sensitive data in proportions that are, within the predetermined confidence limit, representative of the sensitive data in the target data set portions;
      determining whether there is an occurrence of the sensitive data in each sample data set by the computer system searching for the received pattern in the selected sample data sets; and
      determining, by the computer system, a proportion of the sample data sets that have the occurrence of the sensitive data.

9. The system of claim 8 wherein the computer readable storage medium has stored thereon a program for controlling the processor, and wherein the processor is further operative with the program to execute the program for:
   providing for the user, by the computer system, a rating of the target data set based on the proportion of the sample data sets that have the occurrence of the sensitive data.

10. The system of claim 8, wherein in the searching for the received pattern in the selected sample data sets, the computer system stops the searching in each selected sample data set responsive to finding a first occurrence of the received pattern in the respective sample data set.

11. The system of claim 8, wherein the determining the portions of the target data set from which to select sample data sets is responsive to the target data set having database tables, wherein the tables are more numerous than a predefined threshold and each determined portion of the target data set is a table, such that each sample data set is selected from among a respective one of the tables.

12. The system of claim 8, wherein the determining the portions of the target data set from which to select sample data sets is responsive to the target data set having database tables, wherein the tables are not more numerous than a predefined threshold and each determined portion of the target data set is a portion of a respective one of the tables such that each sample data set is selected from a respective one of the portions of a respective one of the tables.

13. The system of claim 8, wherein the determining the portions of the target data set from which to select sample data sets is responsive to the target data set being unstructured data, such that each portion of the target data set is a set of files, wherein the determining the portions of the target data set from which to select sample data sets limits each respective set of files to files within a respective, predefined range of file sizes.

14. The system of claim 8, wherein the determining the size of the sample data set for each respective target data set portion includes determining the size of the respective sample data set further in response to a predetermined level of precision.

15. A computer program product for evaluating risk of sensitive data associated with a target data set, the computer program product including a computer readable storage medium having instructions stored thereon for execution by a computer system, wherein the instructions, when executed by the computer system, cause the computer system to implement a method comprising:

receiving from a user, by the computer system, a pattern that defines sensitive data and a selection of a data set as the target data set for evaluating;

determining, by the computer system, portions of the target data set from which to select sample data sets and a size of a sample data set for each respective target data set portion responsive to sizes of the respective portions of the target data set and to a predetermined confidence limit;

performing, by the computer system, random sampling of the target data set portions to provide sample data sets of the determined sample data set sizes, wherein the sample data sets, although smaller in size than the target data set portions, are of sizes that provide the sensitive data in proportions that are, within the predetermined confidence limit, representative of the sensitive data in the target data set portions;

determining whether there is an occurrence of the sensitive data in each sample data set by the computer system searching for the received pattern in the selected sample data sets; and determining, by the computer system, a proportion of the sample data sets that have the occurrence of the sensitive data.

16. The computer program product of claim 15 wherein the instructions, when executed by the computer system, cause the computer system to implement a method further comprising:

providing for the user, by the computer system, a rating of the target data set based on the proportion of the sample data sets that have the occurrence of the sensitive data.

17. The computer program product of claim 15, wherein in the searching for the received pattern in the selected sample data sets, the computer system stops the searching in each selected sample data set responsive to finding a first occurrence of the received pattern in the respective sample data set.

18. The computer program product of claim 15, wherein the determining the portions of the target data set from which to select sample data sets is responsive to the target data set having database tables, wherein the tables are more numerous than a predefined threshold and each determined portion of the target data set is a table, such that each sample data set is selected from among a respective one of the tables.

19. The computer program product of claim 15, wherein the determining the portions of the target data set from which to select sample data sets is responsive to the target data set having database tables, wherein the tables are not more numerous than a predefined threshold and each determined portion of the target data set is a portion of a respective one of the tables such that each sample data set is selected from a respective one of the portions of a respective one of the tables.

20. The computer program product of claim 15, wherein the determining the portions of the target data set from which to select sample data sets is responsive to the target data set being unstructured data, such that each portion of the target data set is a set of files, wherein the determining the portions of the target data set from which to select sample data sets limits each respective set of files to files within a respective, predefined range of file sizes.

* * * * *